US007616651B2

(12) United States Patent
Blankenship et al.

(10) Patent No.: US 7,616,651 B2
(45) Date of Patent: Nov. 10, 2009

(54) SYSTEM AND METHOD FOR COMMUNICATING DATA PACKETS

(75) Inventors: Dennis N. Blankenship, Holly Springs, NC (US); Glenn L. Preslar, Jr., Holly Springs, NC (US); Thomas W. Scheviak, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/676,367

(22) Filed: Feb. 19, 2007

(65) Prior Publication Data

US 2007/0140284 A1  Jun. 21, 2007

Related U.S. Application Data

(63) Continuation of application No. 10/218,796, filed on Aug. 14, 2002, now Pat. No. 7,180,911.

(51) Int. Cl.
*H04L 12/28* (2006.01)
(52) U.S. Cl. ........................................ 370/412; 711/147
(58) Field of Classification Search ........................ None
See application file for complete search history.

(56) References Cited

U.S. PATENT DOCUMENTS

| 2001/0030970 | A1 | 10/2001 | Wiryaman et al. | 370/401 |
|---|---|---|---|---|
| 2002/0191790 | A1 | 12/2002 | Anand et al. | 380/255 |
| 2003/0012191 | A1 | 1/2003 | Matsumura | 370/389 |
| 2004/0004964 | A1* | 1/2004 | Lakshmanamurthy et al. | 370/394 |
| 2004/0034717 | A1 | 2/2004 | Pelletier et al. | 709/246 |
| 2006/0292292 | A1* | 12/2006 | Brightman et al. | 427/66 |

OTHER PUBLICATIONS

R. Pazhyannur et al., "PPP Multiplexing" Aug. 2000, pp. 1-9.

* cited by examiner

*Primary Examiner*—Duc C Ho
(74) *Attorney, Agent, or Firm*—Baker Botts L.L.P.

(57) ABSTRACT

A method for communicating data packets is provided that includes receiving a data packet at a first processor. A packet handle and interface handle are attached to the data packet. The packet handle, interface handle, and data packet are communicated to a second processor. A plurality of data packets that are destined for the same output are multiplexed. At least one packet handle, one interface handle, and the multiplexed data packet are communicated to the first processor, and the multiplexed data packet is output.

32 Claims, 2 Drawing Sheets

SYSTEM AND METHOD FOR COMMUNICATING DATA PACKETS

CROSS-REFERENCE TO RELATED APPLICATION

This application is a continuation of U.S. application Ser. No. 10/218,796 filed Aug. 14, 2002 and now U.S. Pat. No. 7,180,911, which is hereby incorporated by reference herein.

TECHNICAL FIELD OF THE INVENTION

This invention relates in general to data networks and more particularly to a system and method for communicating data packets.

BACKGROUND OF THE INVENTION

Point to Point Protocol (PPP) multiplexing and demultiplexing permits more efficient utilization of slow speed links, such as a T1 Wide Area Network (WAN) interface. A main processor and co-processor may be implemented so that a co-processor performs a multiplexing function on outbound data packets and a demultiplexing function on inbound data packets. One inherent problem with the co-processor assisted multiplexing scheme is that data packets are decoupled from the packet switch path of the main processor. The data packets are then reinserted back into the main routing path at a later time. Saving and restoring the context of the original packet is critical for managing Quality of Service (QoS), routing data packets appropriately, and maintaining network statistics.

One attempt to avoid the loss of context is to enqueue the packet context and interface context handles, generate a correlator, and pass the correlator to the co-processor. However, this involves a significant amount of processor overhead to accomplish, which may not be acceptable for the time-critical packet switching code path. Therefore, it is desirable to pass context information between the processor and the co-processor in a manner by efficiently using memory and processor resources.

SUMMARY OF THE INVENTION

From the foregoing, it may be appreciated by those skilled in the art that a need has arisen for a method to efficiently multiplex and demultiplex data packets for communication across a slow speed link such as a T1 WAN interface. In accordance with the present invention, a system and method for communicating data packets is provided that substantially eliminates or greatly reduces disadvantages and problems associated with conventional techniques for communicating multiplexed data packets.

According to an embodiment of the present invention, there is provided a method for communicating data packets that includes receiving a data packet at a first processor. A packet handle is attached to the data packet and an interface handle is also attached to the data packet. The packet handle, interface handle, and data packet are communicated to a second processor for appropriate processing. A plurality of data packets that are destined for the same output are multiplexed together at the second processor. At least one packet handle, one interface handle, and the multiplexed data packet are communicated to the first processor. The multiplexed data packet is then transferred out by the first processor.

The present invention provides various technical advantages over conventional techniques for communicating multiplexed data packets. For example, one technical advantage is to track context state information for the data packets that are being communicated. Another technical advantage is the efficient use of resources such as memory reads and memory writes. Yet another technical advantage is to use an inband signaling channel to allow communication between processors. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
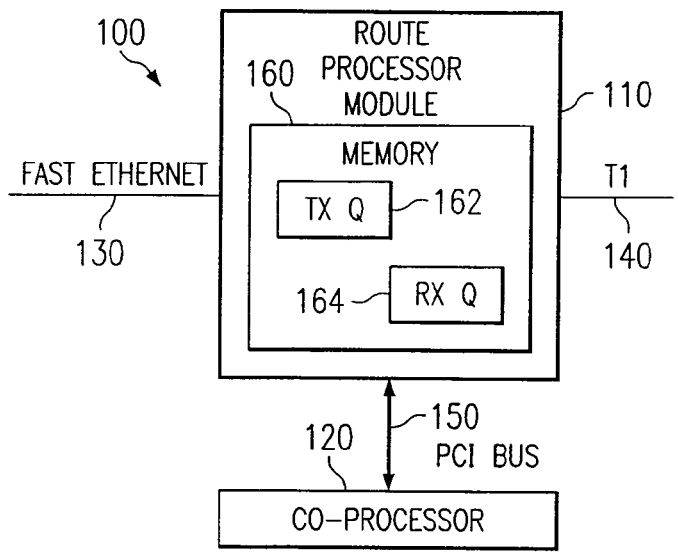
FIG. 1 illustrates an operating environment for a communications processor and co-processor.

FIG. 1 illustrates a data communications network 100 that includes a Route Processor Module (RPM) 110 and a co-processor 120. RPM 110 is operable to receive data packets that are communicated on network 100. In the illustrated embodiment, network 100 includes a communications path 130 and a communications path 140. For purposes of illustration, communications path 130 has a Fast Ethernet format and communications path 140 has a T1 format, though other types of formats and various speeds may be utilized for communication paths 130 and 140. RPM 110 and co-processor 120 are operable to transition data packets between communications paths 130 and 140. In the illustrated embodiment, RPM 110 and co-processor 120 communicate with each other over a Peripheral Component Interconnect (PCI) bus 150. It is envisioned, however, that RPM 110 may communicate with co-processor 120 using any other type of communications format.

In one embodiment of the present invention, RPM 110 receives individual data packets and data packet frames from network 100 and passes them over PCI bus 150 to co-processor 120. Co-processor 120 receives individual data packets from RPM 110 for multiplexing and provides a frame of multiplexed data packets therefrom to RPM 110 for output to network 100. Co-processor 120 may also receive a frame of data packets from RPM 110 for demultiplexing and provides individual data packets therefrom to RPM 110 for output to network 100. RPM 110 and co-processor 120 communicate via Buffer Descriptors (BDs) and associated buffer particles that reside in a memory 160 of RPM 110. Each buffer particle includes a data packet or a portion of a data packet depending on a desired buffer particle size. The BDs are mapped into the PCI address space of co-processor 120 in memory 160. In this manner, RPM 110 may easily access this shared memory region in memory 160, but co-processor 120 arbitrates for access to PCI bus 150, resulting in a less efficient use of memory and processing resources.

In one embodiment of the present invention, the shared memory region of memory 160 includes transmit queues 162 for data packets moving from RPM 110 to co-processor 120 and receive queues 164 for data packets moving from co-processor 120 to RPM 110. Each queue 162 and 164 utilizes a number of Buffer Descriptors (BDs) for storing and accessing buffer particles placed therein and retrieved therefrom. Each buffer particle has an associated BD. Along with a pointer to the particle and its length, there are three other bits in each BD. The FIRST bit indicates that an associated buffer particle is the first in a data packet. The LAST bit indicates that the associated buffer particle is the last in a data packet. The OWNERSHIP bit indicates which of RPM 110 or co-processor 120 owns the buffer. For example all empty transmit BDs are owned by RPM 110 and all empty receive BDs are owned by co-processor 120.

During a transmit operation, RPM 110 takes the first available transmit BD and fills in the associated buffer particle with the data packet to transmit to co-processor 120. In most cases, RPM 110 will fit all of the data packet into one buffer particle. Thus, after filling in the data, RPM 110 will set the FIRST and LAST bits in the BD and the OWNERSHIP bit is set for co-processor 120. Co-processor 120 will periodically poll the transmit queue 162. When the OWNERSHIP bit is set to co-processor 120, co-processor 120 will pull the data packet from the buffer particle of transmit queue 162 into the memory of co-processor 120 and perform the proper operation on the data packet. Once co-processor 120 has pulled the data packet, it no longer needs to tie up the BD and buffer particle of the transmit queue 162. Thus, co-processor sets the OWNERSHIP bit back to the RPM 110.

Occasionally, a data transmit packet will span across two or more particles. For example, when RPM 110 has a packet that spans three particles, the first BD has the FIRST bit set, LAST bit clear, and OWNERSHIP bit set to co-processor 120. The second BD has both FIRST and LAST bits clear and the OWNERSHIP bit set to co-processor 120. The third BD has the FIRST bit clear, LAST bit set, and the OWNERSHIP bit set to co-processor 120. The timely release of multiple BDs associated with one packet may be accomplished with only one resource-costly PCI write operation.

In one embodiment of the present invention, a protocol is established between RPM 110 and co-processor 120 whereby the first BD and buffer particle in a multi-BD data packet is freed, meaning the OWNERSHIP bit is set back to RPM 110 upon receipt by co-processor 120. The other BDs and buffer particles associated with the data packet are freed by RPM 110 by a local write operation even though the OWNERSHIP bit is set to co-processor 120. In operation, when RPM 110 encounters a transmit BD with the FIRST bit set, LAST bit clear, and OWNERSHIP bit set to RPM 110, RPM 110 is free to release via a local memory write operation all subsequent transmit BDs and buffer particles up to and including the final BD and buffer particle that would have the OWNERSHIP bit set to co-processor 120 and the LAST bit set. Also, because interrupts are disruptive to the instruction and data caches of RPM 110, no transmit complete interrupts are driven by co-processor 120. Instead, RPM 110 is able in most cases to defer the reclamation of transmit resources until they are actually needed.

The protocol between RPM 110 and co-processor 120 also permits co-processor 120 to read in multiple transmit BDs via a PCI burst-read operation. In this way co-processor 120 can poll for multiple outstanding network data packets with one PCI operation. To ensure that co-processor 120 processes packets spanning more than one transmit BD and buffer particle correctly, RPM 110 must not set the OWNERSHIP bit to co-processor 120 in any transmit BD until receipt of the buffer particle having its transmit BD with the LAST bit set. Then the OWNERSHIP bit of each transmit BD can be set to co-processor 120. Co-processor 120 reads in a set of transmit BDs and associated buffer particles and continues to process data packets until a BD is encountered with the OWNERSHIP bit set to RPM 110 or until the last BD in the set has the OWNERSHIP bit set to co-processor 120 but the LAST bit is not set. In this instance, the pieces of the last data packet, spanning more than one buffer particle, can be saved in local memory. Another set of BDs and buffer particles can be burst into the memory of co-processor to complete the processing of that data packet as well as any additional new data packets.

The transmit BDs and buffer particles exist as an array in memory 160 of RPM 110. Thus, co-processor 120 must be cognizant of the end of this array and not poll past the end of the array. Instead, co-processor 120 must initiate its next read from the start of the transmit BD array. In addition the BDs are kept as small as possible, such as a length of 16 bytes allocated on an even 16-byte boundary. This facilitates efficient PCI burst read operations by co-processor 120 by only transferring whole pieces of BDs and buffer particles.

Figure 2:
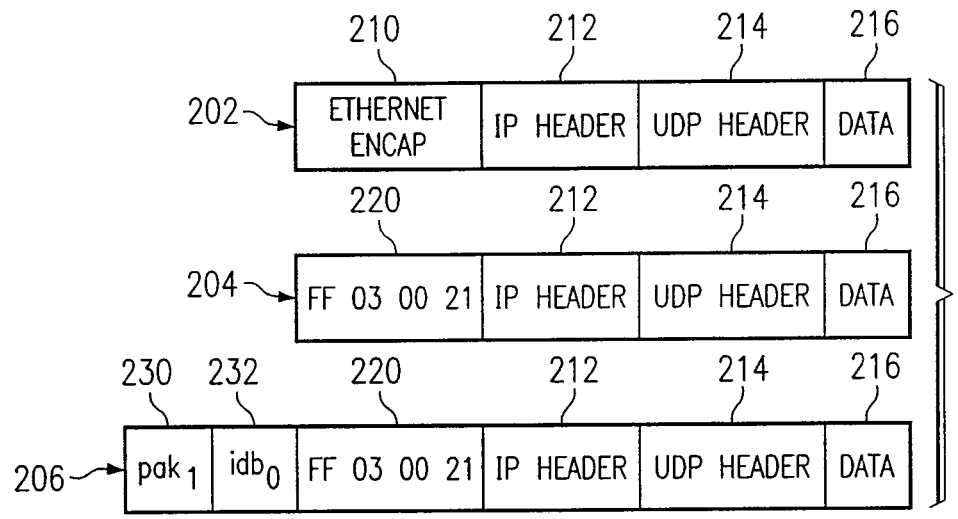
FIG. 2 illustrates a data packet including a packet handle and an interface handle.

FIG. 2 illustrates the structure of a data packet received by RPM 110 from communications path 130. Configuration 202 illustrates the format of the data packet as it is received by RPM 110 from communications path 130. Configuration 204 shows the data packet converted into a Point to Point Protocol (PPP) format. Configuration 206 illustrates the data packet in the format in which it will be communicated to co-processor 120.

As shown in configuration 202, the data packet includes an Ethernet encap 210, an Internet Protocol (IP) header 212, a User Datagram Protocol (UDP) header 214, and a data payload 216. IP header 212 and UDP header 214 contain information that will guide the data packet to the correct destination. RPM 110 removes Ethernet encap 210 from the data packet and replaces it with FF 03 00 21, which is the PPP header 220 for an IP-format packet. In configuration 206, a packet handle 230 and an interface handle 232 are appended to the data packet. Packet handle 230 may be any type of identifier that RPM 110 uses to identify a specific data packet. In one embodiment of the present invention, packet handle 230 is a unique 32-bit number. Interface handle 232 identifies the output interface for which the data packet is destined. In one embodiment of the present invention interface handle 232 is a unique 32-bit number. RPM 110 is operable to communicate with a number of output interfaces across communications path 140. Each output interface is identified by an interface handle 232. In one embodiment of the present invention, RPM 110 communicates with eight different output interfaces at one time. When RPM 110 has placed the data packet in configuration 206, it enqueues the data packet to co-processor 120 via transmit queue 162.

Co-processor 120 receives the data packet from RPM 110 on PCI bus 150. In one embodiment of the present invention, packet handle 230 and interface handle 232 are opaque to co-processor 120, which means that co-processor 120 may read the information contained in packet handle 230 and interface handle 232 but does not change it. One embodiment of the present invention may be generically applied to any network data packet offload processing utilizing a co-processor.

Figure 3:
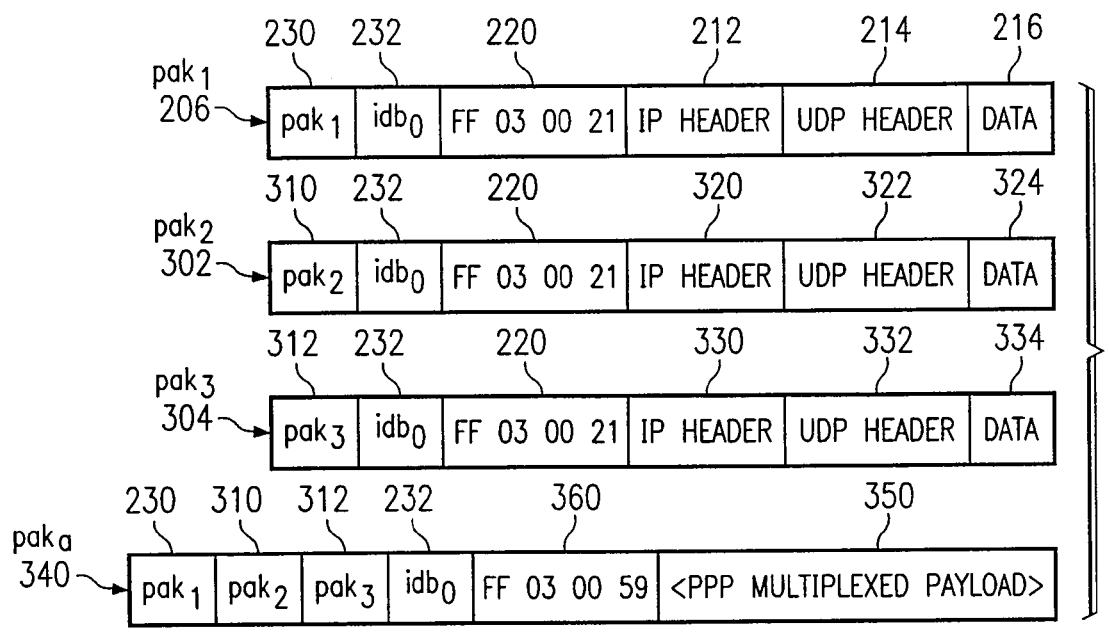
FIG. 3 illustrates a plurality of data packets being multiplexed into a superframe.

FIG. 3 illustrates the process of data packet multiplexing in co-processor 120. Co-processor 120 will look for data packets that are destined for the same output interface, which is indicated by the same interface handle 232. If interface handle 232 is the same for more than one data packet, these data packets will be multiplexed together. In FIG. 3 there are illustrated three data packets, pak1 206, pak2 302, and pak3 304 that have been received by co-processor 120. Co-processor 120 will examine the interface handle component of each data packet. Here, the interface handles for pak1 206, pak2 302, and pak3 304 are each $idb_0$ 232. This indicates that pak1 206, pak2 302, and pak3 304 are to be sent to the same output interface. These three data packets, therefore, may be multiplexed together to increase network efficiency. Co-processor 120 will create a multiplexed data packet $pak_a$ 340 by combining pak1 206, pak2 302, and pak3 304. While $pak_a$ 340 was formed from three individual data packets, co-processor 120 may multiplex any two or more data packets into one multiplexed data packet structure.

In $pak_a$ 340, the data payload 216 from pak1 206 is combined with the data payload 324 from pak2 302 and the data payload 334 from pak3 304 in a PPP multiplexed data payload 350. PPP multiplexed data payload 350 may also be referred to as a superframe. PPP multiplexed data payload 350 is attached to FF 03 00 59, which is the PPP header 360 for a multiplexed packet. In addition to PPP multiplexed data payload 350 and header 360, $pak_a$ 340 contains the packet headers from the three original data packets, as well as interface header 232. By including packet headers 230, 310, and 312, $pak_a$ 340 will be able to be demultiplexed into the three separate data packets at a later time. Interface handle 232 is present to indicate the output interface for which $pak_a$ 340 is destined. Co-processor 120 transmits $pak_a$ 340 to RPM 110 over PCI bus 150. RPM 110 will remove packet handles 230, 310, and 312, and interface handle 232 from $pak_a$ 340. RPM 110 is then operable to direct data packet 340 across communications path 140 to the output interface indicated by interface handle 232. $Pak_a$ 340 may be demultiplexed by another node of network 100 located at the output interface. By transmitting the multiplexed data packet $pak_a$ 340, rather than three separate data packets 206, 302, and 304, significant improvements to network efficiency are achieved.

Figure 4:
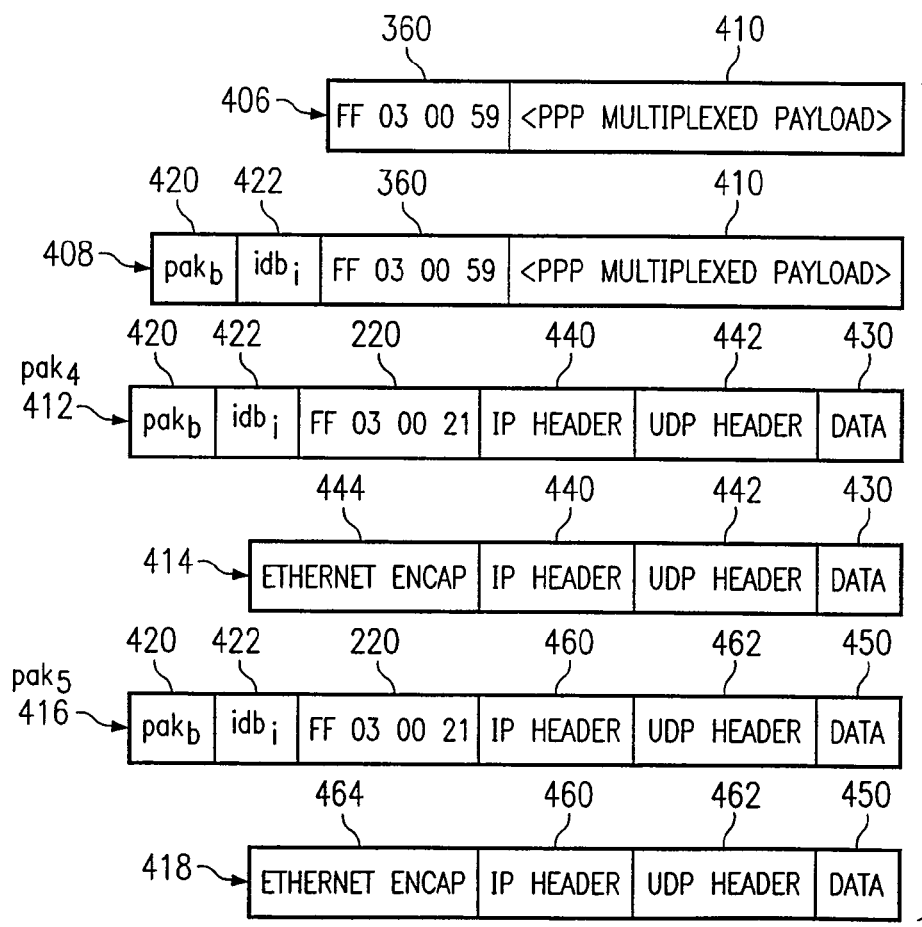
FIG. 4 illustrates the process for de-multiplexing the superframe.

FIG. 4 illustrates how one PPP multiplexed superframe is demultiplexed into multiple PPP data packets. RPM 110 is operable to receive PPP multiplexed data packets on T1 connection 140. The received multiplexed data packet will be in configuration 406, which includes a PPP header 360 for a multiplexed packet and a PPP multiplexed data payload 410. RPM 110 will assign a unique packet handle, $pak_b$ 420, to the data packet. In addition an interface handle 422 that provides source information is appended to the data packet. The multiplexed data packet 408 will be communicated to co-processor 120 across PCI bus 150.

Co-processor 120 receives data packet 408 from PCI bus 150. From PPP multiplexed data payload 410, co-processor extracts a data payload 430 for an individual data packet, pak4 412. Co-processor 120 attaches an appropriate IP header 440 and UDP header 442 to data packet 430 of pak4 412. Co-processor also attaches the packet handle 420 interface handle 422, the PPP header 220 for an IP-format packet, IP header 440, and UDP header 442 to data payload 430. Pak4 412 now represents a data packet that has been demultiplexed from data packet 408. In a similar manner a data payload 450 may be extracted from PPP multiplexed data payload 410. Co-processor 120 attaches packet handle 420, interface handle 422, PPP header 220 for an IP-format packet, IP header 460, and UDP header 462 to data payload 450. The demultiplexed data packet is in the configuration of pak5 416.

Pak4 412 may be transmitted from co-processor 120 to RPM 110 across PCI bus 150. RPM 110 receives pak4 412 and removes packet handle 420, interface handle 422, and PPP header 220 for an IP-format packet. RPM 110 appends the appropriate Ethernet encap 444, IP header 440, and UDP header 442 to the data payload 430 to create data packet 414. Data packet 414 may now be communicated by RPM 110 across Fast Ethernet communications path 130. In the same way, a data packet 418 generated from pak5 416 may be returned to RPM 110 and communicated across Fast Ethernet communications path 130.

One challenge with demultiplexing is that the operating system may not be able to determine how many packets will be returned to RPM 110 from co-processor 120 without actually processing PPP multiplexed data payload 410. In one embodiment of the present invention, an inband signaling channel is provided that facilitates the freeing of resources associated with a packet handle. In the embodiment illustrated in FIG. 4, the low bits of $pak_b$ 420 and $idb_i$ 422 are reserved for the inband signaling channel. Co-processor 120 demultiplexes data payloads 430 and 450 for data packets 414 and 416. For example, recognizing that data packet 414 is not the final data packet to be demultiplexed from PPP multiplexed data payload 410, the low bits of packet handle 420 and interface handle 422 are set to zero. Setting the low bits to zero in the packet and interface handles 420 and 422 signals to RPM 110 that the packet handler resources should not be freed, because it is not the last data packet from PPP multiplexed payload 410. For each data packet returned to RPM 110 that is not the last data packet from PPP multiplexed data payload 410, the low bits of packet and interface handles 420 and 422 will be zero. For pak5 416, however, data payload 450 is the last data payload to be removed from PPP multiplexed payload 410. The low bits of packet and/or interface handles 420 and 422 are set high. By setting the low bits high, RPM 110 is signaled that the final data packet, pak5 416, from PPP multiplexed data payload 410 has been returned. In this way the low bits may be used as an inband signaling channel, requiring fewer resource-expensive memory accesses to process the packet. In addition the proximity of the packet handle with the signaling bits minimizes data cache churn.

Thus, it is apparent that there has been provided, in accordance with the present invention, a system and method for communicating data packets across a network that satisfies the advantages set forth above. Although the present invention has been described in detail, it should be understood that various changes, substitutions, and alterations may be made herein. For example though specific formats and protocols such as IP and UDP have been used in the description of the present invention, other formats and protocols may be used as well. Other examples may be readily ascertainable by those skilled in the art and may be made herein without departing from the spirit and scope of the present invention as defined by the following claims.

What is claimed is:

1. A system for communicating packets, comprising:
  a shared memory operable to store packets in one or more buffer particles, each buffer particle being associated with one of a plurality of processors, the memory including a transmit queue providing a buffer descriptor for each buffer particle, the buffer descriptor for a particular buffer particle including a pointer to the particular buffer particle, the buffer descriptor including a first indicator identifying the particular buffer particle as being a first buffer particle for a particular packet, the buffer descriptor including a second indicator identifying the particular buffer particle as being a last buffer particle for a particular packet, the buffer descriptor including a third indicator identifying what processor is associated with the particular buffer particle.

2. The system of claim 1, further comprising:
  a first processor operable to initiate storage of packets in the shared memory, the first processor operable to set the first, second, and third indicators upon storing of a particular packet in the shared memory.

3. The system of claim 2, wherein the first processor is operable to set the third indicator to indicate that a second processor owns the particular buffer particle upon storage of the particular packet in the shared memory.

4. The system of claim 2, wherein the particular packet is stored in a plurality of buffer particles, the first processor operable to set the first indicator in the buffer descriptor associated with a first one of the plurality of buffer particles.

5. The system of claim 4, wherein the first processor is operable to set the second indicator in the buffer descriptor associated with the last one of the plurality of buffer particles.

6. The system of claim 5, wherein the first processor is operable to set the third indicator in each of the buffer descriptors associated with the plurality of buffer particles upon setting the second indicator in the buffer descriptor associated with the last one of the plurality of buffer particles.

7. The system of claim 1, further comprising:
a first processor operable to poll the transmit queue for the third indicator identifying the first processor, the first processor operable to extract information from the particular buffer particle when the associated buffer descriptor has a third indicator identifying the first processor.

8. The system of claim 7, wherein the first processor is operable to clear the third indicator to indicate that a second processor owns the particular buffer particle upon extracting information from the particular buffer particle.

9. A system for communicating packets, comprising:
means for storing packets in one or more buffer particles, each buffer particle being associated with one of a plurality of processors;
means for providing a pointer to a particular buffer particle;
means for providing a first indicator identifying the particular buffer particle as being a first buffer particle for a particular packet;
means for providing a second indicator identifying the particular buffer particle as being a last buffer particle for a particular packet;
means for providing a third indicator identifying what processor is associated with the particular buffer particle.

10. The system of claim 9, further comprising:
means for initiating storage of packets in the shared memory;
means for setting the first, second, and third indicators upon storing of a particular packet in the shared memory.

11. The system of claim 10, further comprising:
means for setting the third indicator to indicate that a first processor owns the particular buffer particle upon storage of the particular packet in the shared memory.

12. The system of claim 10, further comprising:
means for setting the first indicator in the buffer descriptor associated with a first one of the plurality of buffer particles, wherein the particular packet is stored in a plurality of buffer particles.

13. The system of claim 12, further comprising:
means for setting the second indicator in the buffer descriptor associated with the last one of the plurality of buffer particles.

14. The system of claim 13, further comprising:
means for setting the third indicator in each of the buffer descriptors associated with the plurality of buffer particles to indicate that a first processor owns the particular buffer particle upon setting the second indicator in the buffer descriptor associated with the last one of the plurality of buffer particles.

15. The system of claim 9, further comprising:
means for polling the transmit queue for the third indicator identifying a second processor;
means for extracting information from the particular buffer particle when the associated buffer descriptor has a third indicator identifying the second processor.

16. The system of claim 15, further comprising:
means for clearing the third indicator to indicate that a first processor owns the particular buffer particle upon extracting information from the particular buffer particle.

17. A method for communicating packets, comprising:
storing packets in one or more buffer particles, each buffer particle being associated with one of a plurality of processors;
providing a pointer to a particular buffer particle;
providing a first indicator identifying the particular buffer particle as being a first buffer particle for a particular packet;
providing a second indicator identifying the particular buffer particle as being a last buffer particle for a particular packet;
providing a third indicator identifying what processor is associated with the particular buffer particle.

18. The method of claim 17, further comprising:
initiating storage of packets in the shared memory;
setting the first, second, and third indicators upon storing of a particular packet in the shared memory.

19. The method of claim 18, further comprising:
setting the third indicator to indicate that a first processor owns the particular buffer particle upon storage of the particular packet in the shared memory.

20. The method of claim 18, further comprising:
setting the first indicator in the buffer descriptor associated with a first one of the plurality of buffer particles, wherein the particular packet is stored in a plurality of buffer particles.

21. The method of claim 20, further comprising:
setting the second indicator in the buffer descriptor associated with the last one of the plurality of buffer particles.

22. The method of claim 21, further comprising:
setting the third indicator in each of the buffer descriptors associated with the plurality of buffer particles to indicate that a first processor owns the particular buffer particle upon setting the second indicator in the buffer descriptor associated with the last one of the plurality of buffer particles.

23. The method of claim 17, further comprising:
polling the transmit queue for the third indicator identifying a second processor;
extracting information from the particular buffer particle when the associated buffer descriptor has a third indicator identifying the second processor.

24. The method of claim 23, further comprising:
clearing the third indicator to indicate that a first processor owns the particular buffer particle upon extracting information from the particular buffer particle.

25. A computer readable medium encoded with computer executable instructions, the instructions operable to:
store packets in one or more buffer particles, each buffer particle being associated with one of a plurality of processors;
provide a pointer to a particular buffer particle;
provide a first indicator identifying the particular buffer particle as being a first buffer particle for a particular packet;

provide a second indicator identifying the particular buffer particle as being a last buffer particle for a particular packet;

provide a third indicator identifying what processor is associated with particular buffer particle.

26. The computer readable medium of claim 25, wherein the instructions are further operable to:

initiate storage of packets in the shared memory;

set the first, second, and third indicators upon storing of a particular packet in the shared memory.

27. The computer readable medium of claim 26, wherein the instructions are further operable to:

set the third indicator to indicate that a first processor owns the particular buffer particle upon storage of the particular packet in the shared memory.

28. The computer readable medium of claim 26, wherein the instructions are further operable to:

set the first indicator in the buffer descriptor associated with a first one of the plurality of buffer particles, wherein the particular packet is stored in a plurality of buffer particles.

29. The computer readable medium of claim 28, wherein the instructions are further operable to:

set the second indicator in the buffer descriptor associated with the last one of the plurality of buffer particles.

30. The computer readable medium of claim 29, wherein the instructions are further operable to:

set the third indicator in each of the buffer descriptors associated with the plurality of buffer particles to indicate that a first processor owns the particular buffer particle upon setting the second indicator in the buffer descriptor associated with the last one of the plurality of buffer particles.

31. The computer readable medium of claim 25, wherein the instructions are further operable to:

poll the transmit queue for the third indicator identifying a second processor;

extract information from the particular buffer particle when the associated buffer descriptor has a third indicator identifying the second processor.

32. The computer readable medium of claim 31, wherein the instructions are further operable to:

clear the third indicator to indicate that a first processor owns the particular buffer particle upon extracting information from the particular buffer particle.

* * * * *